US009224059B2

(12) United States Patent
Krüger et al.

(10) Patent No.: US 9,224,059 B2
(45) Date of Patent: Dec. 29, 2015

(54) AUTOMATIC EXAMINATION OF VALUE LABELS

(71) Applicants: Jürgen Krüger, Vlotho (DE); Rainer Anthonj, Rheinau (DE)

(72) Inventors: Jürgen Krüger, Vlotho (DE); Rainer Anthonj, Rheinau (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 14/349,282

(22) PCT Filed: Sep. 27, 2012

(86) PCT No.: PCT/EP2012/069068
§ 371 (c)(1),
(2) Date: Apr. 2, 2014

(87) PCT Pub. No.: WO2013/050290
PCT Pub. Date: Apr. 11, 2013

(65) Prior Publication Data

US 2014/0241569 A1 Aug. 28, 2014

(30) Foreign Application Priority Data

Oct. 4, 2011 (EP) .................................... 11183849

(51) Int. Cl.
*G06K 9/00* (2006.01)
*G06K 9/20* (2006.01)
*G07D 7/00* (2006.01)
*G07D 7/12* (2006.01)
*G07D 7/20* (2006.01)

(52) U.S. Cl.
CPC ............ *G06K 9/2054* (2013.01); *G07D 7/0046* (2013.01); *G07D 7/12* (2013.01); *G07D 7/20* (2013.01)

(58) Field of Classification Search
CPC G06K 9/2018; G06K 9/2054; G06K 9/00456
USPC .......................................................... 382/101
See application file for complete search history.

(56) References Cited

U.S. PATENT DOCUMENTS

| | | | | |
|---|---|---|---|---|
| 3,928,226 | A * | 12/1975 | McDonough et al. | 252/301.35 |
| 4,485,308 | A * | 11/1984 | Rabatin | 250/461.1 |
| 4,504,084 | A * | 3/1985 | Jauch | 380/54 |
| 4,588,211 | A * | 5/1986 | Greene | 283/70 |
| 4,888,803 | A * | 12/1989 | Pastor | 380/51 |
| 5,502,304 | A * | 3/1996 | Berson et al. | 250/271 |
| 5,525,798 | A * | 6/1996 | Berson et al. | 250/271 |
| 5,554,842 | A * | 9/1996 | Connell et al. | 235/491 |
| 5,569,317 | A * | 10/1996 | Sarada et al. | 524/111 |
| 5,731,574 | A * | 3/1998 | Bodie et al. | 235/375 |
| 5,734,723 | A * | 3/1998 | Windel et al. | 380/55 |
| 5,917,925 | A * | 6/1999 | Moore | 382/101 |
| 6,006,991 | A * | 12/1999 | Faklis et al. | 235/462.06 |
| 6,035,061 | A * | 3/2000 | Katsuyama et al. | 382/177 |
| 6,039,257 | A * | 3/2000 | Berson et al. | 235/468 |
| 6,142,380 | A * | 11/2000 | Sansone et al. | 235/487 |
| 6,270,213 | B1 * | 8/2001 | Sansone et al. | 347/100 |
| 6,373,965 | B1 * | 4/2002 | Liang | 382/112 |
| 6,902,265 | B2 * | 6/2005 | Critelli et al. | 347/101 |
| 7,536,553 | B2 * | 5/2009 | Auslander et al. | 713/176 |
| 8,085,438 | B2 * | 12/2011 | Hersch et al. | 358/3.09 |
| 8,534,544 | B1 * | 9/2013 | Eker et al. | 235/375 |
| 2003/0112423 | A1 * | 6/2003 | Vig et al. | 356/71 |
| 2009/0065710 | A1 * | 3/2009 | Hunziker et al. | 250/459.1 |
| 2009/0285448 | A1 * | 11/2009 | Carpenter | G06Q 30/0283 382/101 |
| 2013/0234043 | A1 * | 9/2013 | Hussain | G01N 21/64 250/459.1 |
| 2014/0241569 | A1 * | 8/2014 | Kruger et al. | 382/101 |
| 2014/0247962 | A1 * | 9/2014 | Kruger et al. | 382/101 |

FOREIGN PATENT DOCUMENTS

| | | | |
|---|---|---|---|
| DE | 196 49 874 | A1 | 6/1998 |
| DE | 10 2006 017 764 | A1 | 10/2007 |
| EP | 1 630 748 | A2 | 3/2006 |
| EP | 1 793 330 | A2 | 6/2007 |
| GB | 2 413 422 | A | 10/2005 |

OTHER PUBLICATIONS

International Search Report for corresponding PCT/EP2012/069068 completed Nov. 6, 2012 by Stefan Rother of the EPO.

* cited by examiner

*Primary Examiner* — Gandhi Thirugnanam
(74) *Attorney, Agent, or Firm* — Tarolli, Sundheim, Covell & Tummino LLP

(57) ABSTRACT

The invention relates to a method for the automatic verification of the authenticity of a postage indicium that has a value indication and that has a luminescent area, whereby the postage indicium has been applied onto the surface of a mailpiece, and whereby the surface of the mailpiece is illuminated with light having wavelengths from a spectral region, then a first image of the surface of the mailpiece is taken with a camera system and this first image is evaluated regarding the place of the postage indicia applied onto the surface of the mailpiece, subsequently the postage indicium is irradiated with light having wavelengths from a second spectral region, whereby this light is capable of exciting the luminescence of the luminescent printing ink.

10 Claims, No Drawings

AUTOMATIC EXAMINATION OF VALUE LABELS

RELATED APPLICATIONS

The present invention claims priority from International Published Application No. WO 2013/050290 A1, filed 27 Sep. 2012; which claims priority from EP 11183849.6, filed 4 Oct. 2011, the entirety of both of which is incorporated herein by reference.

DESCRIPTION

The invention relates to a method for the automatic verification of the authenticity of value labels marked by means of luminescent printing ink, with concurrent value recognition. In particular, the invention relates to a method for the automatic verification of the authenticity, and for the value recognition of postage indicia marked with luminescent printing ink.

In this invention, the term "postage indicia" refers to all value indicia and value labels, irrespective of the manner in which they have been applied, for example, by gluing, printing, stamping or the like. In particular, the invention also encompasses printed postage indicia.

The use of modern reproduction techniques is making it increasingly easy to reproduce negotiable instruments such as, for example, postage indicia, with relatively little effort. A reproduction of a postage indicium produced with a modern color photocopier can hardly be distinguished from the original with the naked eye. This increases the risk of forgeries. The verification of the franking of mailpieces, especially of letters, is usually done automatically nowadays. Forged postage indicia are supposed to be recognized in this process.

In order to counter forgeries, it is a known procedure to safeguard securities by means of special encoding. Thus, for instance, German Preliminary Published Application DE 196 49 874 A1 discloses a security having a luminescent background that is present in a certain area and that is partially covered by a substance in a contrasting color such as, for example, a non-luminescent printing ink. The design and arrangement of the covering constitute encoding that correlates with the data specific to that document. When the encoding is being read, the document is illuminated with the exciting radiation of the luminescent substance. A detector that is only sensitive in the spectral region of the luminescent radiation will recognize only the luminescent areas as "bright" areas. The other parts of the document as well as the covering in the luminescent area appear dark to the sensor, as long as the covering reflects or emits little or nothing in the wavelength range of the luminescent radiation. In this manner, a strong contrast is created between the background and the covering, which makes it easy to read the encoding.

German Preliminary Published Application DE 10 2006 017 764 A1 discloses that an approach in which at least two luminescent substances that are different and that emit at different emission wavelengths are arranged at different places on the surface of the negotiable instrument and/or security document, so that they form a luminescent substance pattern, whereby each emission wavelength is associated with a character and whereby each place is associated with a character position, so that, through a selection of the various luminescent substances in conjunction with their placement, a machine-readable first character string is formed. Through the use of a suitable energy input to excite the luminescence, a pattern with various emission wavelengths of various luminescent substances can be recognized by a machine, and this pattern contains encoded information that, after being decoded, can be compared to other information of the negotiable instrument for validation purposes.

U.S. Pat. No. 4,588,211 describes a device that can automatically read the contents of negotiable instruments such as, for example, checks. Here, the data is, at least partially, printed or written on a luminescent background. On the basis of the position of the luminescence, the device recognizes which text has to be detected and it then detects this text. The document is irradiated with light having a wavelength that is capable of exciting the luminescence. The characters to be read are applied with an ink that is not luminescent and they create a contrast with the fluorescent background so that they can be recognized.

U.S. Pat. No. 7,536,553 B2 discloses a method for automatically authenticating the authenticity of a postage indicium that has a fluorescent area and a value indication, whereby the postage indicium is applied onto a surface of a mailpiece, comprising the following steps:

- the surface of the mailpiece is illuminated with light having wavelengths from a first spectral region,
- a first image of the surface of the mailpiece is taken with a camera system,
- the first image is evaluated regarding the place or places of postage indicia applied on the surface of the mailpiece,
- the surface of the mailpiece is illuminated with light having wavelengths from a second spectral region, whereby this light is capable of exciting the fluorescence of the fluorescent printing ink,
- a second image of the surface of the mailpiece is taken with a camera system,
- the second image is evaluated regarding the place or places of luminescence,
- the two evaluations are compared regarding the criterion of the presence of luminescence at the place or places where the evaluation of the first image has shown that postage indicia have been applied, whereby the only postage indicia that are further examined in the subsequent steps are those for which the presence of fluorescence was ascertained,
- an image section or image sections of the second image are defined at the place or places where the presence of postage indicia was ascertained,
- the image section or image sections are evaluated regarding the determination of the placement and geometry of the fluorescence pattern or fluorescence patterns of each postage indicium that was detected on the surface of the mailpiece and for which the presence of fluorescence was ascertained,
- the evaluation of the image section or image sections is compared to stored luminescence patterns and, if this yields a match, the decision is made that a given postage indicium is authentic.

Conventional postage indicia have a luminescent marking that is located in a defined area on the postage indicium. This can be a border, bar or other pattern printed with luminescent ink, whereby the value indication is applied outside of this luminescent area. However, it is also possible for the postage indicium to have a spread-out luminescent area on which the value indication has been applied with non-luminescent ink. The luminescent property cannot be detected by the naked eye under illumination that resembles daylight. However, in any case, the value indication can be detected by the naked eye under illumination that resembles daylight.

When the mailpieces run through the sorting machine, the detected postage indicia are cancelled by means of a marking.

This marking can be printed or stamped on and can be detected by the human eye under illumination that resembles daylight.

Complex sorting machines, which involve high investment costs, are used to verify the authenticity and value of postage indicia that have been applied onto mailpieces. These sorting machines are used in mail distribution centers that handle a high volume of mail. Consequently, the mailpieces have to run through the machine at a high speed, whereby at the same time, high demands are made of the verification results. Postage indicia are checked for authenticity and for the eventuality of having been re-used, which can be recognized by the presence of a cancellation marking. Reliable reading of the encoding on the luminescent background requires a strong contrast between the background and the encoding. This can be achieved by intense excitation of the luminescence by means of high-energy radiation, for example, in the infrared or ultraviolet range. On the other hand, however, a mailpiece must not be irradiated too intensely since this could cause the mailpiece to overheat or suffer some other kind of damage. If, for example, the irradiation intensity is low, then the luminescence, and thus the contrast between the background and the encoding, are also low, as a result of which the recognition speed decreases. Consequently, the speed at which the mailpieces run through the sorting system has to be reduced. Therefore, in order to ensure the same total throughput rate of a mail distribution center, more sorting machines have to be purchased.

The objective of the invention is to put forward a method that increases the speed at which it is possible to reliably and automatically verify the authenticity of postage indicia that have a luminescent area and that have been applied onto the surface of a mailpiece. Moreover, the objective of the invention is to put forward a device for carrying out the method.

According to the invention, this objective is achieved by a method disclosed herein.

Moreover, the objective is achieved by a device disclosed herein.

In order to carry out the method according to the invention for the automatic verification of the authenticity of a postage indicium that has a luminescent area and that has been applied onto the surface of a mailpiece, first of all, the surface of the mailpiece is illuminated with light having wavelengths from a first spectral region. This can be, for example, illumination that resembles daylight. Under this illumination, a first image of the surface of the mailpiece is taken with a camera system and this first image is evaluated regarding the place of the postage indicia applied onto the surface of the mailpiece. Subsequently, the postage indicium is irradiated with light having wavelengths from a second spectral region, whereby this light is capable of exciting the luminescence of the luminescent printing ink, and a second image of the postage indicium is taken under this illumination with a camera system. This second image is evaluated regarding the place of the luminescent area. Subsequently, the two evaluations are compared regarding the criterion of the presence of luminescence at the place or places where the evaluation of the first image has shown that postage indicia have been applied, whereby the only postage indicia that are further examined in the subsequent steps are those for which the presence of luminescence was ascertained. Subsequently, an image section or several image sections of the second image are defined at the place or places where the presence of postage indicia was ascertained. This image section or these image sections are evaluated regarding the determination of the placement and geometry of the luminescence pattern or luminescence patterns of each postage indicium that was detected on the surface of the mailpiece and for which the presence of luminescence was ascertained. The evaluation of the image section or image sections is compared to stored luminescence patterns and, if this yields a match, the decision is made that a given postage indicium is authentic. The two-stage verification increases the speed of the recognition of the authenticity since the first verification that looks for the presence of luminescence at the place or places of postage indicia takes place very quickly. The quality of the verification is enhanced by the second stage of the verification of the specific luminescence pattern, whereby the only postage indicia that are examined in the second stage of the verification are those for which the presence of luminescence was ascertained in the first stage. The authenticity verification of the postage indicium by means of the detection of luminescence can be carried out under such a low illumination intensity that the mailpiece is not damaged.

In an advantageous refinement of the method, the first image of the surface of the mailpiece is evaluated by reading the indicated value of the applied postage indicium that has been recognized as being authentic. In this process, information present on the postage indicium such as, for example, the value indication, can be read by means of OCR software in a control unit. OCR stands for Optical Character Recognition. Optical character recognition is carried out under illumination with light having wavelengths from a first spectral region, for example, a spectral region that resembles daylight, whereby here, too, the radiation is not high enough to damage the mailpiece since, for example, light radiation with a wavelength spectrum that resembles daylight has less energy at the same radiation intensity than light radiation with a wavelength spectrum that is capable of exciting the luminescence. By separating the authenticity verification from the reading of information, the throughput rate at which the postage indicia run through the device can be further increased without damaging mailpieces by radiation or impairing the quality of the recognition.

The quality of the verification can be further enhanced in that the place of the value indication in relation to a luminescent area of the postage indicium is checked. These place relationships can be stored in a database system that is located in a separate control unit, in a control unit of the sorting system, or in a central unit, whereby the sorting system is connected to the central unit.

If several postage indicia have been applied onto a mailpiece, the values of the postage indicia that have been recognized as being authentic are added up so that the total value of the postage on the mailpiece is detected.

In an especially advantageous embodiment, the first image as well as the second image are taken with the same camera system. This lowers the investment costs for such a device and reduces the space required to set up such a device.

Moreover, it has proven to be advantageous if, during the evaluation of the second image, the intensity of the luminescence is also evaluated. The absorbed intensity of the luminescence can be compared, for instance, to luminescence intensities stored in a database system, and this comparison can be additionally used for the verification of the authenticity of the postage indicium, a procedure which translates into a further enhancement in the quality of the authenticity verification. The database system can be located in a separate control unit, in a control unit of the sorting system, or in a central unit, whereby the sorting system is connected to the central unit.

It has proven to be particularly advantageous for the stored luminescence patterns and luminescence intensities and, optionally, the place relationships of value indications to luminescent areas not to be entered manually but rather, to be determined on the basis of the postage indicia located in the stream of mailpieces, which is done in that detected luminescence patterns and luminescence intensities are stored as a reference pattern as a function of an adjustable frequency of the occurrence. In this manner, the method autonomously learns new postage indicia. If certain luminescence patterns and/or luminescence intensities occur frequently in the stream of mailpieces, then it is highly probable that these are authentic postage indicia. The limits above which a frequency can be interpreted as an indication of authenticity can be adjusted. In an advantageous embodiment of the invention, luminescence patterns and/or luminescence intensities that were not yet known but that occur frequently can be confirmed manually as being authentic.

In other advantageous embodiments of the invention, the length and width dimensions of the mailpieces are ascertained during the evaluation of the first image or of the second image. Moreover, the thickness of each mailpiece can be ascertained. In many cases, this information already makes it possible to determine the required postage rate. If the weight of the mailpiece is also ascertained, for example, by weighing it, then the required postage rate can be determined as a function of the mailpiece dimensions and weight, and this can be compared to the amount of the added-up values of the postage indicia that have been found on the surface of the mailpiece and that have been recognized as being authentic. Here, mailpieces recognized as having insufficient postage can be diverted from the process. The required postage rates for mailpieces having different dimensions and/or weights can be stored in a database.

A device according to the invention for carrying out the method comprises a camera system, a first illumination device for illuminating mailpieces with light having wavelengths from a first spectral region, a second illumination device for illuminating mailpieces with light having wavelengths from a second spectral region, whereby this light is capable of exciting the luminescence of the luminescent printing ink, and the device also comprises a control unit that is capable of evaluating images taken with the camera system and of recognizing characters by means of OCR software.

In an advantageous refinement of the invention, the device can be integrated into a sorting system. Here, the control unit normally present in the sorting system can also be used to evaluate the image information transmitted by the camera system, so that no separate control unit is needed. Moreover, this makes it possible to easily control the diversion of mailpieces that are franked with forged postage indicia or that are recognized as having insufficient postage.

The invention claimed is:

1. A method for the automatic verification of the authenticity of postage indicia that have a value indication and that have a luminescent area, whereby the postage indicium has been applied onto the surface of a mailpiece, comprising the following steps:

the surface of the mailpiece is illuminated with light having wavelengths from a first spectral region, a first image of the surface of the mailpiece is taken with a camera system, the first image is evaluated regarding the place or places where the postage indicia have been applied onto the surface of the mailpiece, the surface of the mailpiece is illuminated with light having wavelengths from a second spectral region, whereby this light is capable of exciting the luminescence of the luminescent printing ink, a second image of the surface of the mailpiece is taken with a camera system, the second image is evaluated regarding the place or places of luminescence, the two evaluations are compared regarding the criterion of the presence of luminescence at the place or places where the evaluation of the first image has shown that postage indicia have been applied, whereby the only postage indicia that are further examined in the subsequent steps are those for which the presence of luminescence was ascertained, an image section or image sections of the second image are defined at the place or places where the presence of postage indicia was ascertained, this image section or these image sections are evaluated regarding the determination of the placement and geometry of the luminescence pattern or luminescence patterns of each postage indicium that was detected on the surface of the mailpiece and for which the presence of luminescence was ascertained, the evaluation of the image section or image sections is compared to stored luminescence patterns and, if this yields a match, the decision is made that a given postage indicium is authentic, whereby the stored luminescence patterns and luminescence intensities are determined on the basis of the postage indicia located in a stream of mailpieces, which is done in that detected luminescence patterns and luminescence intensities are stored as a reference pattern as a function of an adjustable frequency of the occurrence, the image section or image sections are evaluated regarding the determination of the intensity of the luminescence of each postage indicium that was detected on the surface of the mailpiece and for which the presence of luminescence was ascertained, the intensity of the luminescence is compared to stored luminescence intensities and, if this yields a match, the decision is made that a given postage indicium is authentic.

2. The method according to claim 1, wherein the first image of the surface of the mailpiece is evaluated by reading the indicated value of the applied postage indicium that has been recognized as being authentic.

3. The method according to claim 2, wherein the value of all of the postage indicia that have been applied to the surface of the mailpiece and that have been recognized as being authentic are added up.

4. The method according to claim 1, wherein the first image as well as the second image are taken with the same camera system.

5. The method according to claim 1, wherein luminescence patterns and luminescence intensities that have occurred with an adjustable frequency have to be confirmed manually as reference patterns.

6. The method according to claim 1, wherein the length and width dimensions of the mailpieces are ascertained during the evaluation of the first image or of the second image.

7. The method according to claim 6, wherein the thickness of each mailpiece is ascertained.

8. The method according to claim 7, wherein the weight of the mailpiece is ascertained.

9. The method according to claim 8, wherein a required postage rate can be determined as a function of the mailpiece dimensions and weight, and this can be compared to the amount of the added-up values of the postage indicia that have been found on the surface of the mailpiece and that have been recognized as being authentic, whereby mailpieces recognized as having insufficient postage can be diverted from the process.

10. The method according to claim 9, wherein required postage rates for mailpieces having at least one of different dimensions and weights are stored in a database.

* * * * *